United States Patent [19]
Langlands

[11] 3,806,596
[45] Apr. 23, 1974

[54] METHOD FOR IMPARTING ANTI-DEPRESSANT AND/OR ANTI-ANXIETY EFFECTS TO ANIMALS

[75] Inventor: Ross Langlands, Renton Maidenhead, England

[73] Assignee: Aspro-Nicholas Limited, London, England

[22] Filed: Sept. 11, 1972

[21] Appl. No.: 288,224

[30] Foreign Application Priority Data
Sept. 25, 1971  Great Britain.................... 44761/71

[52] U.S. Cl. .............................................. 424/254
[51] Int. Cl............................................ A61k 27/00
[58] Field of Search ................................... 424/254

[56] References Cited
OTHER PUBLICATIONS

Chem. Abst., Vol. 62, 15999a (1965).
Chem. Abst., Vol. 62, 14694–14695 (1965).
Chem. Abst., Vol. 72, 121568(m) (1970).

Primary Examiner—Stanley J. Friedman

[57] ABSTRACT

A method is provided for treating depression and/or anxiety in humans which comprises administering thereto a therapeutically effective amount of 5-phenyl-5-(2'-piperidylmethyl) barbituric acid or acid addition salt thereof.

14 Claims, No Drawings

METHOD FOR IMPARTING ANTI-DEPRESSANT AND/OR ANTI-ANXIETY EFFECTS TO ANIMALS

The present invention relates to the treatment of depression and/or anxiety in human subjects.

We disclosed in our U.K. Patent Specification No. 977321 that certain barbituric acid derivatives were active in suppressing tremorine induced spasms in mice, which was at that time a recognised screening test for compounds useful in the treatment of Parkinson's disease (paralysis agitans). It has now been found that one of said barbituric acid derivatives has pronounced anti-depressant and anti-anxiety activity, said derivative being 5-phenyl-5-(2'-piperidylmethyl)barbituric acid of the formula

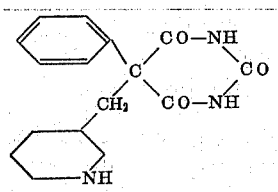

According to the present invention therefore, there is provided a method of treating human subjects suffering from depression and/or anxiety which comprises administering to the subject an anti-depressant and/or anti-anxiety amount of 5-phenyl-5-(2'-piperidylmethyl) barbituric acid or a pharmaceutically acceptable acid addition salt thereof.

The active compound can be prepared by a two stage process in which 5-phenylbarbituric acid is first alkylated with 2-chloromethylpyridine to give 5-phenyl-5-(2'-pyridylmethyl) barbituric acid, which then is catalytically hydrogenated to the 5-phenyl-5-(2'-piperidylmethyl)barbituric acid. Such a preparation may be represented as follows:

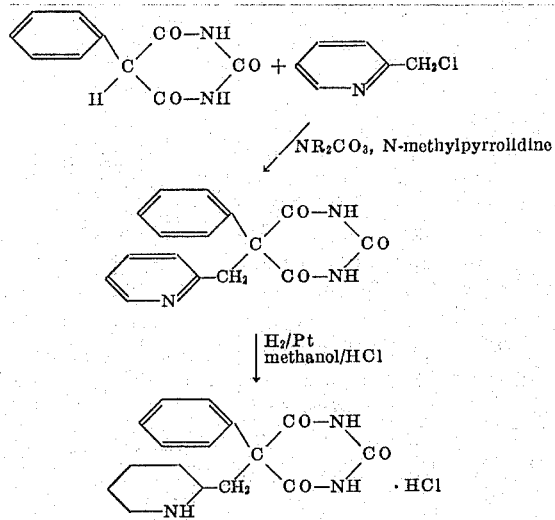

An alternative route is described in Example 5 of U.K. Patent Specification No. 977321. Other methods of preparation will be readily apparent to those skilled in the art.

The active compound usually is employed in the form of its pharmaceutically acceptable acid addition salts, in particular the hydrochloride. Other suitable acid addition salts include those with inorganic acids, for example hydrobromic, nitric, sulphuric and phosphoric acids, or with organic acids, for example organic carboxylic acids such as acetic, glycollic, maleic, hydroxymaleic, malic, tartaric, citric, salicylic, o-acetyloxybenzoic, nicotinic and isonicotinic acids, or organic sulphonic acids such as methane sulphonic, ethane sulphonic, 2-hydroxyethane sulphonic, p-toluene sulphonic and naphthalene 2-sulphonic acids.

The active compound can be administered orally, rectally or parentally in the form of, for example, tablets, capsules, suppositories, suspensions or solutions. Advantageously for this purpose formulations can be provided in dosage unit form each of which unit preferably contains from 1 to 500 mg of the active compound. When the active compound is administered orally, the dosage normally is in the range 50 to 3000 mg per day, the preferred dosage being 300 to 1800 mg per day. Corresponding dosages for administration by other routes will be apparent to those skilled in the art.

The active compound usually is administered in association with a pharmaceutically acceptable carrier. For example, said compound can be mixed with a carrier, diluted with a carrier, or enclosed or encapsulated by a carrier in the form of a capsule, sachet, cachet, paper, or other container. The carrier which serves as a vehicle, excipient or diluent for the active compound can be a solid, semi-solid or liquid material. Some examples of carriers which can be employed are lactose, dextrose, sucrose, sorbitol, mannitol, starch, gum arabic, calcium phosphate, liquid paraffin, cocoa butter, oil of theobroma, alginates, tragacanth, gelatin, syrup B.P., methyl cellulose, sodium lauryl sulphate, polyoxyethylene sorbitan monolaurate, and methyl - and propyl - hydroxy-benzoates.

Unlike most other anti-depressants, 5-phenyl-5-(2'-piperidylmethyl)barbituric acid does not antagonise reserpine induced hypothermia or ptosis in mice and does not prolong amphetamine-induced stereotyped behaviour in rat. The first evidence of anti-depressant and anti-anxiety activity was the observation of euphoria as a side effect when the active compound was administered to healthy human volunteers in human pharmacology tests conducted during investigation of the anti-Parkinsonian activity of the compound. In one test healthy human volunteers received oral doses of the active compound three times daily for five days at levels of 100, 200, 300 and 400 mg. A slight feeling of euphoria was noticeable especially at the upper dose levels of 300 and 400 mg. In another test healthy human volunteers received oral single doses at levels of from 50 to 600 mg. in 50 mg steps. There appeared to be a characteristic feeling of light-headedness at dose levels of from 450 to 600 mg and slight elation was noticed at the 200 mg level.

Evidence of mood elevation or central nervous system stimulation was found during three clinical trials conducted to assess the anti-Parkinsonian activity of the active compound. In one of these trials 200 mg doses of the active compound were administered four times daily for one month to six patients suffering from mild Parkinson's disease. Four of the six patients showed an elevation in mood. In another trial 25 patients suffering from Parkinson's disease were treated with daily doses of the active compound at levels between 600 mg and 1 g. Almost all of the patients showed clear elevation of mood with increase in drive and, in some cases, even a certain euphoria. In the third trial 38 patients suffering from Parkinson's disease were treated with daily dosages of 600, 900 and 1200 mg per day of the active compound. Most of the patients showed an elevation in mood at all three dosage levels (compared with the administration of an equivalent amount of placebo), although three severely disabled patients showed deterioration in mood.

In support of the results observed during the clinical trials (including human pharmacology) supra, it has been found that the active compound has an alerting effect in mice and cats (at levels of 200 mg/kg and 2.5 – 20 mg/kg respectively) and, in common with other anti-anxiety agents, antagonises metrazole induced convulsions in mice (at levels of 100 to 400 mg/kg).

The following Examples illustrate formulations which are suitable for administering to humans the active compound in accordance with the present invention.

EXAMPLE 1

| Tablet formulation | mg/tablet |
| --- | --- |
| 5-phenyl-5-(2'-piperidylmethyl) barbituric acid hydrochloride (active compound) | 200 |
| corn (maize) starch | 40 |
| lactose granules* | 179 |
| Talc. | 10.5 |
| Stearic acid | 25.74 |
| *lactose granules consist of: | |
| lactose | 85.5% w/w |
| aqueous maize starch paste (1 in 10) | 14.5% w/w |

EXAMPLE 2

| Tablet formulation | mg/tablet |
| --- | --- |
| active compound | 100 |
| lactose | 228 |
| corn (maize starch) | 70 |
| ethylcellulose N 100 | 8 |
| talc | 20 |
| stearic acid | 4 |

EXAMPLE 3

| Capsule formulation | mg/tablet |
| --- | --- |
| active compound | 100 |
| lactose | 25 |

EXAMPLE 4

| Suppository formulation | each suppository |
| --- | --- |
| active compound | 100 mg |
| oil of theobroma | 1 g |

Human patients suffering from depression or anxiety may be treated with the tablets and suppositories of Examples 1 to 3 in, for example, the following dosages:

| | |
| --- | --- |
| tablets of Ex. 1 | two tablets three times daily |
| tablets of Ex. 2 | two tablets three times daily |
| suppositories of Ex. 4 | two suppositories three times daily |

Having regard to the foregoing disclosure, the following is claimed as the inventive and patentable embodiments thereof:

1. A method of treating a human subject suffering from depression which comprises administering to a human subject an anti-depressant amount of 5-phenyl-5-(2'-piperidylmethyl) barbituric acid or a pharmaceutically acceptable acid addition salt thereof.

2. A method as claimed in claim 1 wherein the 5-phenyl-5-(2'-piperidylmethyl) barbituric acid is in the form of its hydrochloride salt.

3. A method as claimed in claim 1 wherein the said acid or salt is administered in association with a pharmaceutically acceptable carrier.

4. A method as claimed in claim 1 wherein the said acid or salt is administered orally.

5. A method as claimed in claim 1 wherein the said acid or salt is administered rectally.

6. A method as claimed in claim 1 wherein the said acid or salt is administered parenterally.

7. A method as claimed in claim 1 wherein the said acid or salt is administered in dosage unit form in dosage units containing from 1 to 500 mg of the said acid or salt.

8. A method of treating a human subject suffering from anxiety which comprises administering to a human subject an antianxiety amount of 5-phenyl-5-(2'-piperidylmethyl) barbituric acid or a pharmaceutically acceptable acid addition salt thereof.

9. A method as claimed in claim 8, wherein the 5-phenyl-5-(2'-piperidylmethyl) barbituric acid is in the form of its hydrochloric salt.

10. A method as claimed in claim 8, wherein the said acid or salt is administered in association with a pharmaceutically acceptable carrier.

11. A method as claimed in claim 8, wherein the said acid or salt is administered orally.

12. A method as claimed in claim 8, wherein the said acid or salt is administered rectally.

13. A method as claimed in claim 8, wherein the said acid or salt is administered parenterally.

14. A method as claimed in claim 8, wherein the acid or salt is administered in dosage unit form in dosage units containing from 1 to 500 mg of the said acid or salt.

* * * * *

UNITED STATES PATENT OFFICE
CERTIFICATE OF CORRECTION

Patent No. 3,806,596                 Dated April 23, 1974

Inventor(s) Dr. Ross Langlands Renton

It is certified that error appears in the above-identified patent and that said Letters Patent are hereby corrected as shown below:

Column 3, line 16    : "supra" should be --supra--

Column 1, lines 21-25: formula "

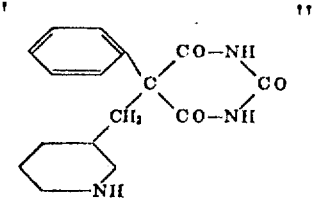

"

should be

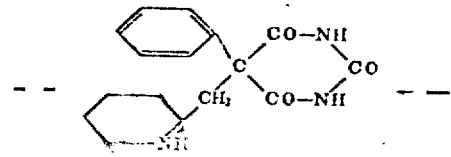

Signed and Sealed this tenth Day of February 1976

[SEAL]

Attest:

RUTH C. MASON
Attesting Officer

C. MARSHALL DANN
Commissioner of Patents and Trademarks